United States Patent
Goncalves et al.

(10) Patent No.: US 9,287,779 B2
(45) Date of Patent: Mar. 15, 2016

(54) SYSTEMS AND METHODS FOR 100 PERCENT DUTY CYCLE IN SWITCHING REGULATORS

(71) Applicant: QUALCOMM Incorporated, San Diego, CA (US)

(72) Inventors: Ricardo T Goncalves, Chandler, AZ (US); Troy Stockstad, Chandler, AZ (US); Joseph D Rutkowski, Chandler, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 13/828,044

(22) Filed: Mar. 14, 2013

(65) Prior Publication Data

US 2014/0266117 A1 Sep. 18, 2014

(51) Int. Cl.
*G05F 1/00* (2006.01)
*H02M 3/158* (2006.01)
*H02M 1/08* (2006.01)
*H02M 3/155* (2006.01)
*H02M 1/00* (2007.01)

(52) U.S. Cl.
CPC ............... *H02M 3/158* (2013.01); *H02M 1/08* (2013.01); *H02M 3/155* (2013.01); *H02M 2001/0003* (2013.01); *H02M 2001/0045* (2013.01)

(58) Field of Classification Search
CPC ............... H02M 3/156–3/158; H02M 3/1582; H02M 3/1584; H02M 3/1588; H02M 3/33507; H02M 5/293; H02M 3/155; H02M 2001/0003; H02M 2001/0045; G05F 1/66; G05F 1/455; G05F 1/445

USPC ......... 323/237, 242, 243, 268, 271, 282–284, 323/288

See application file for complete search history.

(56) References Cited

U.S. PATENT DOCUMENTS

| | | | |
|---|---|---|---|
| 6,229,289 B1 | 5/2001 | Piovaccari et al. | |
| 7,372,238 B1 | 5/2008 | Tomiyoshi | |
| 7,598,715 B1 * | 10/2009 | Hariman et al. | 323/271 |
| 7,633,782 B1 * | 12/2009 | Herbert | 363/125 |
| 8,080,987 B1 * | 12/2011 | Qiu et al. | 323/288 |
| 8,193,798 B1 * | 6/2012 | Pace et al. | 323/284 |

(Continued)

OTHER PUBLICATIONS

Kisun Lee, et al., "Comparison between Ramp Pulse Modulation (RPM) and Constant Frequency Modulation for the Beat Frequency Oscillation in Voltage Regulators," IEEE, Mar. 2010, pp. 3101-3106.

(Continued)

*Primary Examiner* — Gary L Laxton
*Assistant Examiner* — Kevin H Sprenger
(74) *Attorney, Agent, or Firm* — Fountainhead Law Group P.C.

(57) ABSTRACT

The present disclosure includes systems and methods for 100% duty cycle in switching regulators. A switching regulator circuit includes a ramp generator to produce a ramp signal having a period and a comparator to receive the ramp signal and an error signal, and in accordance therewith, produce a modulation signal. In a first mode of operation, the ramp signal increases to intersect the error signal, and in accordance therewith, changes a state of a switching transistor during each period of the ramp signal. In a second mode of operation, the error signal increase above a maximum value of the ramp signal, and in accordance therewith, the switching transistor is turned on for one or more full periods of the ramp signal.

18 Claims, 5 Drawing Sheets

(56) References Cited

U.S. PATENT DOCUMENTS

| | | |
|---|---|---|
| 2007/0013355 A1 | 1/2007 | Liao |
| 2009/0102440 A1* | 4/2009 | Coles .......................... 323/271 |
| 2012/0038341 A1 | 2/2012 | Michishita et al. |
| 2012/0049826 A1 | 3/2012 | Hsu et al. |
| 2012/0049829 A1 | 3/2012 | Murakami |
| 2012/0194159 A1 | 8/2012 | Harriman et al. |
| 2013/0021009 A1 | 1/2013 | Waltman et al. |

OTHER PUBLICATIONS

International Search Report and Written Opinion—PCT/US2014/025485—ISA/EPO—Mar. 30, 2014.

* cited by examiner

SYSTEMS AND METHODS FOR 100 PERCENT DUTY CYCLE IN SWITCHING REGULATORS

BACKGROUND

The present disclosure relates to switching regulators, and in particular, to systems and methods for 100% duty cycle in switching regulators.

Switching regulators are used in a wide variety of electronic applications. One common application of a switching regulator is to generate a power supply voltage that supplies a regulated voltage to one or more integrated circuits (ICs). One example switching regulator is a buck regulator. In a buck regulator, a power source provides input voltage and input current. The power source is coupled to one terminal of a switch, which is commonly a switching transistor (e.g., a PMOS transistor). Another terminal of the switch is coupled to a load through a filter. In a buck converter, the output voltage is less than the input voltage. This is typically achieved by opening and closing the switch at a duty cycle according to the following equation:

Duty Cycle=$V_{out}/V_{in}$.

Buck switching regulators typically have a maximum duty cycle limitation for the switch of less than 100%. This limitation is a result of requirements from the control circuitry to be reset every switching period, such as slope compensation in a current mode architecture. If the controller for a buck regulator cannot support operation up to 100% duty cycle, this directly impacts the minimum input voltage to support a regulated output by a factor of Vout/duty cycle.

SUMMARY

The present disclosure includes systems and methods for 100% duty cycle in switching regulators. A switching regulator circuit includes a ramp generator to produce a ramp signal having a period and a comparator to receive the ramp signal and an error signal, and in accordance therewith, produce a modulation signal. In a first mode of operation, the ramp signal increases to intersect the error signal, and in accordance therewith, changes a state of a switching transistor during each period of the ramp signal. In a second mode of operation, the error signal increase above a maximum value of the ramp signal, and in accordance therewith, the switching transistor is turned on for one or more full periods of the ramp signal.

The following detailed description and accompanying drawings provide a better understanding of the nature and advantages of the present disclosure.

DETAILED DESCRIPTION

The present disclosure pertains to switching regulators. In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
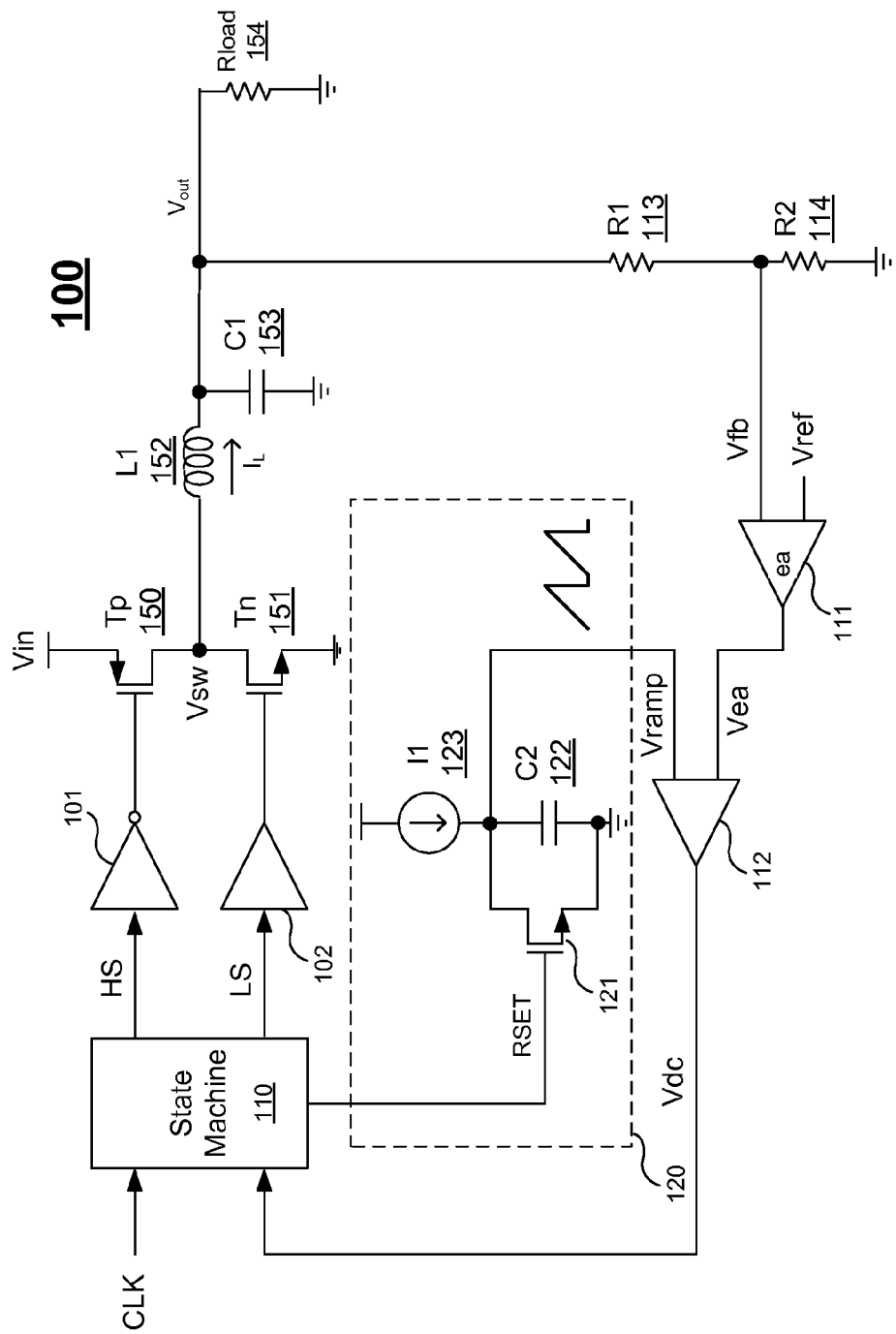
FIG. 1 illustrates a switching regulator according to one embodiment.

FIG. 1 illustrates an example switching regulator circuit according to an embodiment of this disclosure. Switching regulator 100 includes a PMOS transistor Tp 150, NMOS transistor Tn 151, inductor L1 152, capacitor C1 153, and load illustrated by Rload 154. The load may be one or more electronic circuits, such as an integrated circuit, for example. One terminal of Tp receives input voltage Vin and the other terminal of Tp is coupled to switching node having a voltage Vsw. One terminal of Tn is coupled to the switching node and the other terminal of Tn is coupled to a reference voltage (e.g., ground). Tn and Tp act as switches to selectively couple nodes in the circuit together. While Tp is a PMOS transistor and Tn is an NMOS transistor in this example, it is to be understood that other switch structures and arrangements could be used. The example switching regulator architecture shown here is just one of many switching topologies that may use the techniques described herein.

Drivers 101 and 102 turn Tp and Tn on and off. When Tp is on, Tn is off, and Vsw is equal to Vin. In this state, the ac voltage across the inductor is Vin−Vout, and the inductor current $I_L$ increases. For a buck converter architecture shown in this example, Vin is greater than Vout (Vin>Vout). When Tn is on, Tp is off, and Vsw is equal to ground. In this state, the ac voltage across the inductor is −Vout, and the inductor current $I_L$ decreases. The inductor current into the output load generates an output voltage Vout. In this example, feedback operates to maintain the output voltage at a predetermined voltage. In other embodiments described below, current may be used as a feedback parameter (e.g., current control mode), for example. Accordingly, embodiments of the disclosure may include switching regulators that sense output voltage, output current, or both.

In this example, output voltage Vout is used as feedback. One example feedback circuit includes resistors R1 113 and R2 114 which may receive Vout and produce a feedback signal Vfb to the input of error amplifier (ea) 111. Error amplifier 111 may also receive a reference (e.g., in this case a voltage, Vref) to produce an error signal Vea. Vea may be based on an output voltage, or in other embodiments, an output current. In this example, the output of error amplifier 111 is coupled to an input of a comparator 112. Another input of comparator 112 is coupled to a ramp generator 120. Comparator 112 is one example means for comparing a ramp signal and an error signal to produce a modulation signal. Ramp generator 120 produces a ramp signal Vramp. Vramp is compared to Vea to produce a modulation signal Vdc, which may be coupled to state machine 110 to produce drive signals HS and LS to turn Tp and Tn on and off.

In this example, ramp generator 120 includes a current source 123, a capacitor (C2) 122 and a discharge transistor 121. Current source 123, capacitor 122, and discharge transistor 121 are one example means for generating a ramp signal. Current source 123 produces a current I1 into capacitor 122. As current I1 flows into C2, the voltage on capacitor 122 increases approximately linearly to produce Vramp. State machine 110 produces a reset signal RSET. In this example, transistor 121 acts as a switch to discharge capacitor C2. For instance, RSET turns on transistor 121 and charge stored on capacitor 122 is coupled to a reference voltage (e.g., ground). RSET is a periodic signal related to a clock signal CLK. Thus, the voltage Vramp on capacitor 122 may increase linearly to a maximum value and then decrease to ground with the same period as RSET. Current I1, capacitance C2, a reference voltage (e.g., ground), and a period and duty cycle of RSET may determine the maximum value and minimum value of Vramp. As described in more detail below, since the magnitude of the current I1 sets the slope of Vramp, the magnitude of current I1 from current source 123 may be configured to set the maximum value of the ramp signal to be less than a maximum value of the error signal, for example.

Figure 2:
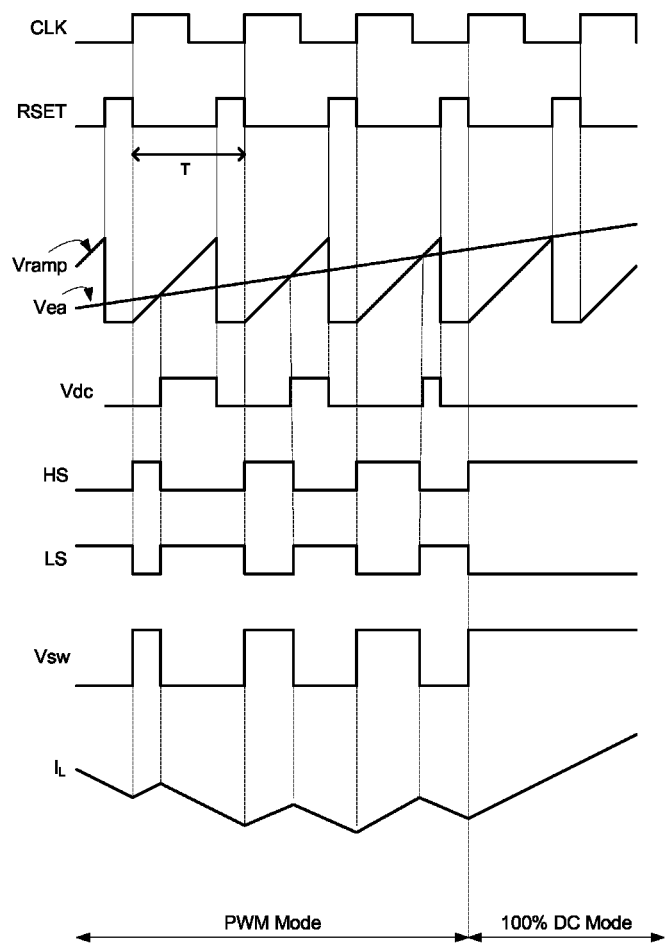
FIG. 2 illustrates waveforms associated with the switching regulator in FIG. 1.

FIG. 2 illustrates waveforms associated with the switching regulator in FIG. 1. FIG. 2 shows a clock signal CLK having a 50% duty cycle and a period T. A reset signal RSET may have the same period as CLK, but a different duty cycle. Here, RSET transitions to a high state before the rising edge of CLK. The rising edge of CLK causes RSET to transition to a low state. As described above, Vramp increases while RSET is low. When RSET is in a high state, Vramp is reset to a constant value (e.g., ground). When RSET is in a low state, Vramp increases to a maximum value. Accordingly, the time period that RSET is in the low state, which is related to the period and duty cycle of RSET, may be configured to set the maximum value of the ramp signal to be less than the maximum value of the error signal.

FIG. 2 shows an error signal Vea across a range of values for illustrative purposes. As Vramp increases, it may intersects Vea. When Vramp is less than Vea, Vdc (the output of comparator 112) is low, and when Vramp is greater than Vea, Vdc is high. Vramp intersects Vea again when the ramp is reset. Accordingly, when Vea is less than the maximum value of Vramp and greater than a minimum value of Vramp (here, ground), Vdc transitions between states (e.g., twice) during each period of the ramp signal. For instance, when Vramp increases to intersect Vea, Vdc transitions from a low state to a high state, and when Vramp is reset, Vdc transitions from a high state to a low state.

As illustrated in FIG. 2, the period of time Vdc is high decreases as Vea increases. Vdc in turn, may be used to control switching transistor Tp and Tn. In this example, high side drive signal HS goes high with the rising edge of CLK, and low side drive signal LS goes low with the rising edge of CLK. In this state, Tp is on, Tn is off, and switch node Vsw is equal to Vin. In this example, the drive signals transition on the rising edge of Vdc. Thus, when Vramp intersects Vea, causing Vdc to go high, HS goes low and LS goes high. In this state, Tn is on, Tp is off, and Vsw is equal to ground. As Vea increases, FIG. 2 illustrates that the period of time the modulation signal Vdc is high decreases. In turn, the time HS is high and LS is low increases, which corresponds to longer on times for Tp and longer off times for Tn, which increases the inductor current.

In one embodiment, a switching regulator operates in two modes as illustrated in FIG. 2. In a first mode, ramp signal Vramp increases to intersect error signal Vea. As described above, changes in Vea result in modulation of Vdc, and the state of Tp and Tn change (e.g., from on to off) during each period of the ramp signal. Thus, this mode is referred to as PWM mode. However, as illustrated in FIG. 2, in a second mode of operation the error signal Vea increases above a maximum value of the ramp signal Vramp. Accordingly, switching transistor Tp is turned on for one or more full periods of ramp signal Vramp. When Tp is on for a full period, the duty cycle is 100%. Thus, this mode is referred to as 100% duty cycle mode (100% DC Mode). For example, if the current into the load increases, Vout and Vfb may drop, causing Vea to go up. The load current $I_L$ is illustrated in FIG. 2 across a range of values for Vea. As shown, when Vea increases above a maximum value of Vramp, the duty cycle is 100% and the inductor current increases continuously across multiple periods of Vramp. In 100% DC mode, Vout will eventually be about equal to Vin and the slope of the inductor current will be approximately zero (e.g., flat).

Features and advantages of the present disclosure include an error signal that may achieve values greater than a maximum value of Vramp. For example, error amplifier 111 may have a wider output voltage range in response to a range of inputs of Vfb than the full range of Vramp. In particular, error amplifier 111 may have a gain that amplifies a difference between Vfb and Vref to generate Vea across a range of values greater than a range of values of the ramp signal Vramp. The particular gain implemented for error amplifier 111 may depend on design parameters, which include output current and voltage, the attenuation of the feedback resistor divider (e.g., resistors 113 and 114), and the minimum value, maximum value, and slope (e.g., I1 and C2) of the ramp signal, for example.

Figure 3:
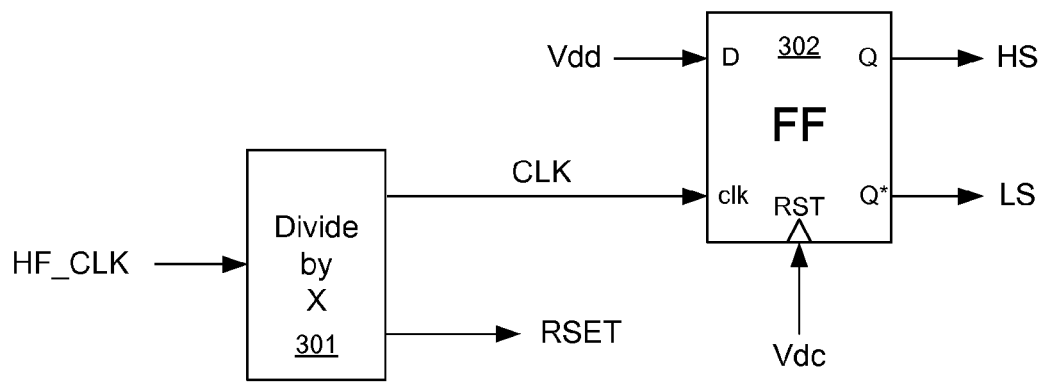
FIG. 3 illustrates example control logic in a switching regulator according to one embodiment.

FIG. 3 illustrates a portion of control logic in state machine 110. In one embodiment, a high frequency clock HF_CLK may be divided down to produce a switching frequency clock CLK and reset signal RSET. In this example, HF_CLK is received by divider circuit 301. Divider circuit 301 divides HF_CLK to produce CLK and RSET. As illustrated above, CLK may have a 50% duty cycle and RSET has a duty cycle less than 50%. RSET sets the period of the ramp signal by discharging capacitor C2 if FIG. 1 at a set frequency. CLK is received by a flip flop (FF) 302 to produce high side drive signal HS and low side drive signal LS. In this example, FF 302 is a delay type flip flop (D-FF) having a delay input (D) to receive a high voltage (e.g., Vdd) and CLK input to transfer the logical value at the D input to output Q. Modulation signal Vdc is received on a reset (RST) input of FF 302. The Q output of FF 302 produces the HS signal and a Q* (logical inverse of Q) output produces the LS signal. CLK and RSET have the same period, and in the example of FIG. 2 the rising edge of CLK, which controls one transition of HS and LS, is coincident with the falling edge of RSET, which turns on Vramp. Accordingly, a time period between a first transition of HS and LS and a second transition produced by Vdc corresponds to a value of Vea.

Figure 4:
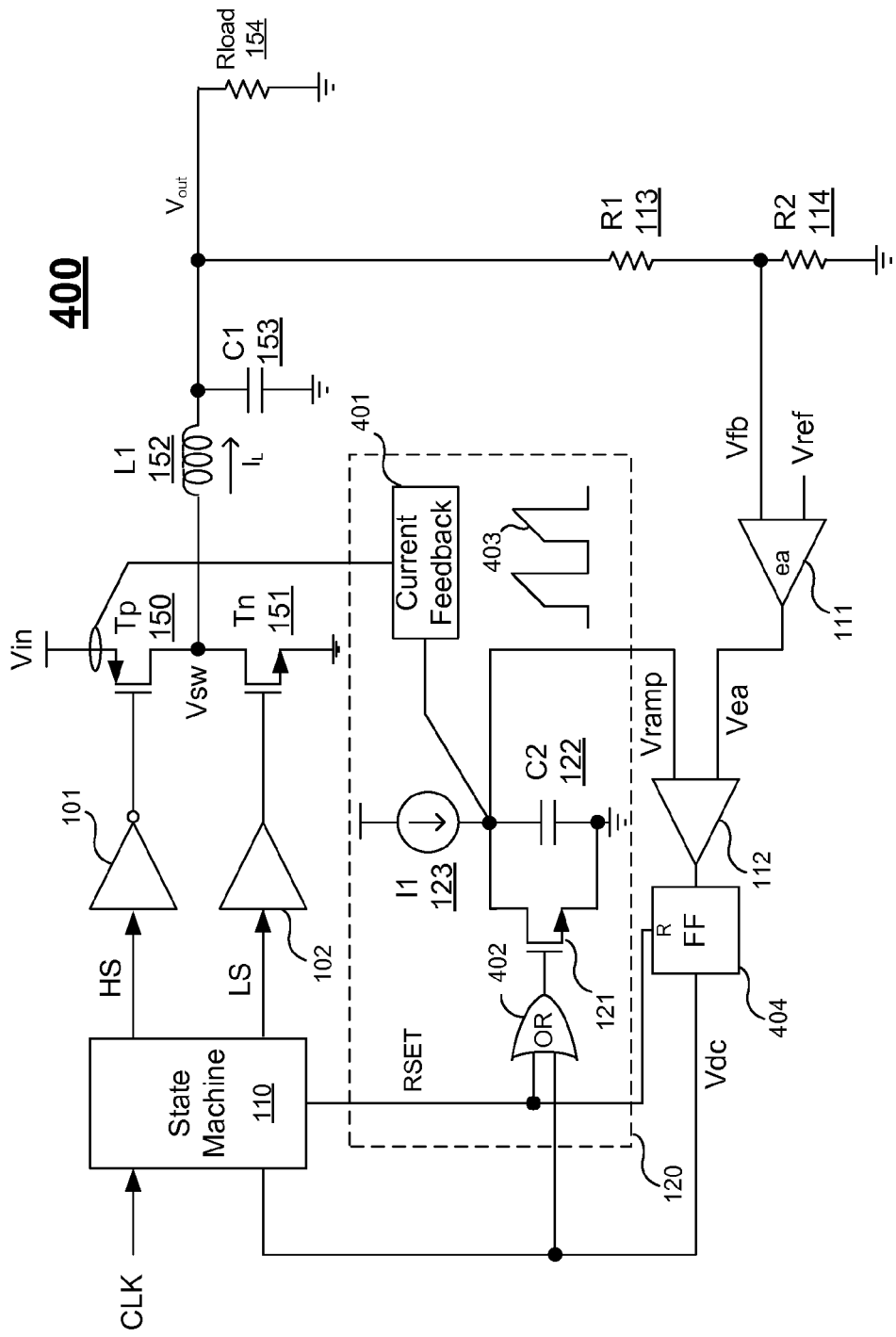
FIG. 4 illustrates a switching regulator according to one embodiment.

FIG. 4 illustrates an example switching regulator circuit according to another embodiment of this disclosure. Switching regulator 400 is substantially the same as switching regulator 100, but is configured for current control. In this example, current control circuits include a current feedback circuit 401 having an input coupled to a terminal of transistor Tp 150 (e.g., in this case, the input terminal). Current feedback circuit 401 has an output coupled to a terminal of capacitor 122. Current feedback circuit 401 senses current in Tp, which corresponds to the output current during portions of each period when Tp is turned on. Current feedback circuit 401 produces an offset in ramp signal Vramp as illustrated at 403 in FIG. 4. The magnitude of the current source and the offset may be configured to set the maximum value of Vramp to be less than a maximum value of the error signal as describe below. Vea is compared to Vramp using comparator 112. In this example, the output of comparator 112 is coupled to a flip flop 404. The output of flip flop 404 produces modulation signal Vdc as described in more detail below. Flip flop 404 may be included as part of state machine 110, for example, but is shown separate here for illustrative purposes.

Figure 5:
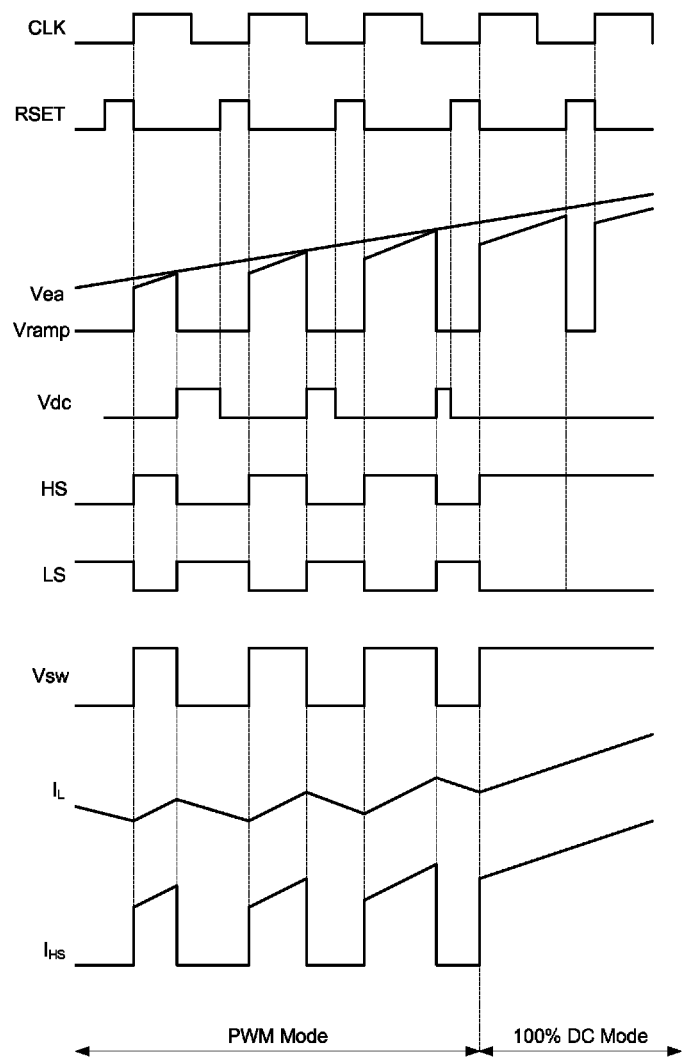
FIG. 5 illustrates waveforms associated with the switching regulator in FIG. 4.

FIG. 5 illustrates waveforms associated with the switching regulator 400 in FIG. 4. As illustrated in FIG. 5, when RSET goes low, Vramp increases to a first offset voltage corresponding to the output current and then begins to increase linearly. Initially, at the beginning of each clock period Vdc is low, HS is high, and LS is low, corresponding to Tp on and Tn off (increasing output current). When Vramp intersects Vea, comparator 112 generates a pulse to flip flop 404. The output of comparator 112 produces a transition in Vdc from low to high. When Vdc goes high, HS goes low and LS goes high, corresponding to Tp off and Tn on (decreasing output current). Vdc remains high until the next rising edge of RSET. Vdc is reset low at the output of FF 404 when RSET transitions from low to high. In this example, capacitor C2 is reset based on either of two conditions—Vdc high or RSET high. Therefore, when Vramp meets Vea, Vdc goes high, and Vdc is coupled to transistor 121 through OR gate 402 to set Vramp to ground. However, Vramp remains at ground because RSET transitions from low to high, which resets FF 404 and resets Vdc to low, but maintains transistor 121 on.

FIG. 5 further illustrates an error signal Vea that may achieve values greater than a maximum value of Vramp. Similar to the embodiment in FIGS. 1 and 2, error amplifier 111 may have a wider output voltage range in response to a range of inputs of Vfb than the full range of Vramp. Accordingly, switching regulator 400 operates in two modes as illustrated in FIG. 5. In a first mode, Vramp increases to intersect error signal Vea. As described above, changes in Vea result in modulation of Vdc, and the state of Tp and Tn change (e.g., from on to off) during each period of the ramp signal. Thus, this mode is similarly referred to as PWM mode. However, as illustrated in FIG. 5, in a second mode of operation the error signal Vea increases above a maximum value of Vramp. Accordingly, switching transistor Tp is turned on for one or more full periods of Vramp. When Tp is on for a full period, the duty cycle is 100% (100% DC Mode). FIG. 5 illustrates switching node Vsw, inductor current $I_L$, and the high side current in transistor Tp for different states of Vdc and different modes of operation.

An example where having 100% duty cycle operation is advantageous is for a switched mode battery charger. For example, the maximum buck duty cycle, along with a power path resistance, may determine the minimum charger input voltage that can support a given charge current and end-of-charge (float) voltage. 100% duty cycle operation may be used in battery charger applications to allow lower input voltages and/or higher charge currents.

The above description illustrates various embodiments of the present invention along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A buck switching regulator circuit comprising:
   a first switching transistor having an input terminal to receive an input voltage and an output terminal coupled to an output node through an inductor;
   a ramp generator to produce a ramp signal having a period; and
   a comparator to receive the ramp signal and an error signal, and in accordance therewith, produce a modulation signal,
   wherein, in a first mode of operation, the ramp signal increases to intersect the error signal, and in accordance therewith, changes a state of the first switching transistor during each period of the ramp signal, and in a second mode of operation, the error signal increases above a maximum value of the ramp signal, and in accordance therewith, the first switching transistor is turned on for a period of time greater than one or more full periods of the ramp signal, and wherein the first switching transistor remains turned on when the error signal is greater than a maximum value of the ramp signal, wherein a current through the inductor to the output node increases continuously across multiple periods of the ramp signal when the error signal is above the maximum value of the ramp signal.

2. The circuit of claim 1 wherein the error signal is generated by an error amplifier having a first input coupled to receive a feedback voltage from the output node and a second input coupled to a reference voltage.

3. The circuit of claim 1, the ramp generator comprising:
   a current source;
   a capacitor having a terminal coupled to the current source; and
   a switch,
   wherein the magnitude of the current source is configured to set said maximum value of the ramp signal to be less than a maximum value of the error signal.

4. The circuit of claim 1 wherein the ramp generator receives a reset signal, wherein the ramp signal has a constant value when the reset signal is in a first state, and wherein the ramp signal increases to said maximum value when the reset signal is in a second state, and wherein a time period of the second state of the reset signal is configured to set said maximum value of the ramp signal to be less than a maximum value of the error signal.

5. The circuit of claim 4 further comprising a divider circuit to receive a clock signal and produce the reset signal, the clock signal setting the period of the ramp signal.

6. The circuit of claim 1, the ramp generator further comprising a current feedback circuit to sense a current in the buck switching regulator and produce an offset in the ramp signal, wherein said maximum value of the ramp signal is less than a maximum value of the error signal.

7. The circuit of claim 6, the ramp generator comprising:
   a current source;
   a capacitor having a terminal coupled to the current source;
   a switch; and
   an OR gate having a first input coupled to receive a reset signal and a second input coupled to receive the modulation signal, wherein the ramp signal has a constant value when the reset signal is in a first state, and wherein the ramp signal increases to said maximum value when the reset signal is in a second state;
   wherein the magnitude of the current source and the offset are configured to set said maximum value to be less than a maximum value of the error signal.

8. A method comprising:
   receiving an input voltage on an input terminal of a first switching transistor of a buck switching regulator, the first switching transistor having an output terminal coupled to an output node through an inductor;
   generating a ramp signal having a period; and
   comparing the ramp signal and an error signal to produce a modulation signal,
   wherein in a first mode of operation, the ramp signal increases to intersect the error signal, and in accordance therewith, changes a state of the first switching transistor during each period of the ramp signal, and in a second mode of operation, the error signal increases above a maximum value of the ramp signal, and in accordance therewith, the first switching transistor is turned on for a period of time greater than one or more full periods of the ramp signal, and wherein the first switching transistor remains turned on when the error signal is greater than a maximum value of the ramp signal, wherein a current through the inductor to the output node increases continuously across multiple periods of the ramp signal when the error signal is above the maximum value of the ramp signal.

9. The method of claim 8 wherein the error signal is generated based on a feedback voltage from the output node and a reference voltage.

10. The method of claim 8, generating the ramp signal comprising:
   generating a current into a capacitor; and
   discharging the capacitor in response to a first signal,
   wherein the magnitude of the current is configured to set said maximum value of the ramp signal to be less than a maximum value of the error signal.

11. The method of claim 8, generating the ramp signal comprising:
   receiving a reset signal, wherein the ramp signal has a constant value when the reset signal is in a first state, and wherein the ramp signal increases to said maximum value when the reset signal is in a second state, and wherein a time period of the second state of the reset signal is configured to set said maximum value of the ramp signal to be less than a maximum value of the error signal.

12. The method of claim 11 further comprising dividing a clock signal and producing the reset signal, the clock signal setting the period of the ramp signal.

13. The method of claim 8 further comprising:
   sensing a current in the buck switching regulator; and
   producing an offset in the ramp signal based on the sensed current, wherein said maximum value of the ramp signal is less than a maximum value of the error signal.

14. The method of claim 13, generating the ramp signal comprising:
   generating a current into a capacitor; and
   discharging the capacitor in response to a logical OR of a reset signal and the modulation signal,
   wherein the ramp signal has a constant value when the reset signal is in a first state, and wherein the ramp signal increases to said maximum value when both the reset signal and modulation signal are in a second state;
   wherein the magnitude of the current source and the offset are configured to set said maximum value of the ramp signal to be less than a maximum value of the error signal.

15. A buck switching regulator circuit comprising:
   a first switching transistor having an input terminal to receive an input voltage and an output terminal coupled to an output node through an inductor;
   means for generating a ramp signal, the ramp signal having a period; and
   means for comparing the ramp signal and an error signal to produce a modulation signal,
   wherein in a first mode of operation, the ramp signal increases to intersect the error signal, and in accordance therewith, changes a state of the first switching transistor during each period of the ramp signal, and in a second mode of operation, the error signal increases above a maximum value of the ramp signal, and in accordance therewith, the first switching transistor is turned on for a period of time greater than one or more full periods of the ramp signal, and wherein the first switching transistor remains turned on when the error signal is greater than a maximum value of the ramp signal, wherein a current through the inductor to the output node increases continuously across multiple periods of the ramp signal when the error signal is above the maximum value of the ramp signal.

16. The circuit of claim 1 wherein the output node is coupled to a battery, and wherein the buck switching regulator charges the battery.

17. The method of claim 8 wherein the output node is coupled to a battery, and wherein the buck switching regulator charges the battery.

18. The circuit of claim 15 wherein the output node is coupled to a battery, and wherein the buck switching regulator charges the battery.

* * * * *